United States Patent
Shishido et al.

(10) Patent No.: US 9,426,413 B2
(45) Date of Patent: Aug. 23, 2016

(54) VIDEO SIGNAL PROCESSING APPARATUS AND METHOD

(71) Applicant: JVC KENWOOD CORPORATION, Yokohama-shi, Kanagawa (JP)

(72) Inventors: Tomoyuki Shishido, Kawasaki (JP); Hideki Aiba, Moriya (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 276 days.

(21) Appl. No.: 14/186,004

(22) Filed: Feb. 21, 2014

(65) Prior Publication Data

US 2014/0240458 A1    Aug. 28, 2014

(30) Foreign Application Priority Data

Feb. 25, 2013 (JP) ................ 2013-034296

(51) Int. Cl.
    *H04N 9/67* (2006.01)
    *H04N 7/01* (2006.01)
    *H04N 13/00* (2006.01)

(52) U.S. Cl.
    CPC ............ *H04N 7/0127* (2013.01); *H04N 9/67* (2013.01); *H04N 13/0029* (2013.01); *G09G 2320/0242* (2013.01); *G09G 2320/0252* (2013.01); *G09G 2340/06* (2013.01)

(58) Field of Classification Search
    None
    See application file for complete search history.

(56) References Cited

U.S. PATENT DOCUMENTS

| 2008/0238952 A1* | 10/2008 | Kanou | G09G 3/3607 345/690 |
| 2010/0223526 A1* | 9/2010 | Hong | H04N 19/67 714/755 |
| 2010/0259625 A1* | 10/2010 | Yamada | H04N 17/004 348/189 |

FOREIGN PATENT DOCUMENTS

| JP | 2005-148521 A | 6/2005 |
| JP | 2010-197548 A | 9/2010 |

* cited by examiner

*Primary Examiner* — Huy T. Nguyen
*Assistant Examiner* — Eileen Adams
(74) *Attorney, Agent, or Firm* — Nath, Goldberg & Meyer; Jerald L. Meyer

(57) ABSTRACT

A first RGB converter is configured to convert a luminance signal and a color difference signal of a first frame signal to a first RGB signal. The first frame signal is a current frame having a first number of bits. A second RGB converter is configured to place at least one lower bit of the first frame signal on the least significant bit side of a second frame signal to form composite data having the first number of bits and to convert the composite data to a second RGB signal. The second frame signal is a previous frame having a second number of bits composed of upper bits of the first number of bits other than at least one lower bit. An overdrive processing unit is configured to correct an amplitude of the first RGB signal corresponding to the difference between the first and second RGB signals.

6 Claims, 3 Drawing Sheets

VIDEO SIGNAL PROCESSING APPARATUS AND METHOD

CROSS REFERENCE TO RELATED APPLICATION

This application is based upon and claims the benefit of priority under 35 U.S.C. §119 from Japanese Patent Application No. 2013-034296, filed on Feb. 25, 2013, the entire contents of which are incorporated herein by reference.

BACKGROUND

The present disclosure relates to a video signal processing apparatus and a video signal processing method which process video signals and supply the same to a liquid crystal display device to cause the liquid crystal display device to perform overdrive which reduces motion image blur by compensating the response speed of the liquid crystals.

As described in Japanese Patent Laid-open Publication No. 2005-148521 (PTL 1) and No. 2010-197548 (PTL 2), in order to improve the display characteristics of motion images, the liquid crystal display apparatus generally includes a frame rate converter which converts the frame frequency of video signals by a severalfold factor, such as a doubled or quadrupled frequency. The liquid crystal display device receives the video signals with the frame rate increased by the frame rate converter for displaying video.

Moreover, as described in PTLs 1 and 2, the liquid crystal display device includes an overdrive processing unit which reduces motion image blur by compensating the response speed of the liquid crystals. The overdrive is also referred to as "temporal emphasis" that emphasizes high-frequency components along the time-axis.

In order to overdrive the liquid crystal display device by using the overdrive processing unit, video signals of a current frame and video signals of the previous frame are necessary. The previous frame is obtained by using a frame memory to delay the video signal of the current frame by one frame.

SUMMARY

In recent years, higher image quality has been demanded, and the number of bits of video signals supplied to the liquid crystal display device has increased. Accordingly, the data rate for accessing the frame memories to write and read video signals in and from the frame memories has considerably increased.

The increase in the data rate for accessing the frame memories complicates signal processing. The complicated signal processing could cause troubles including an increase in heat generation and an increase in cost.

In the video signal processing devices including the frame rate converter and the overdrive processing section, it is desirable that the signal processing for accessing the frame memories is simplified as much as possible. However, when video signals require the overdrive effect, it is necessary to adequately overdrive liquid crystal display devices without adversely influencing the overdrive operation.

In order to address the aforementioned requirements, an object of the embodiments is to provide a video signal processing apparatus and a video signal processing method which are capable of adequately overdriving a liquid crystal display device without adversely influencing the overdrive operation and in which the signal processing to access the frame memory can be simplified.

In order to solve the aforementioned problems of the conventional techniques, a first aspect of the embodiments provides a video signal processing apparatus, including: a frame rate converter configured to write first and second video signals in a frame memory, the first and second video signals having a first frame frequency and each including a luminance signal and a color difference signal each of which has a first number of bits, to read from the frame memory, a first frame signal of a current frame having the first number of bits and a second frame signal of a frame previous to the current frame, the second frame signal having a second number of bits composed of upper bits of the first number of bits other than at least one lower bit, and to convert and output the first and second frame signals at a second frame frequency higher than the first frame frequency; a first RGB converter configured to convert the luminance signal and color difference signal of the first frame signal to a first RGB signal; a second RGB converter configured to place at least one lower bit of the first frame signal on the least significant bit side of the second frame signal to form composite data having the first number of bits and to convert the luminance signal and color difference signal of the composite data to a second RGB signal; and an overdrive processing unit configured to correct an amplitude of the first RGB signal corresponding to the difference between the first and second RGB signals.

A second aspect of the embodiments provides a video signal processing method, including: writing first and second video signals in a frame memory, the first and second video signals having a first frame frequency and each including a luminance signal and a color difference signal each of which has a first number of bits; reading from the frame memory, a first frame signal of a current frame having the first number of bits and a second frame signal of a frame previous to the current frame, the second frame signal having a second number of bits composed of upper bits of the first number of bits other than at least one lower bit; converting the first and second frame signals to a second frame frequency higher than the first frame frequency; converting the luminance signal and color difference signal of the first frame signal to a first RGB signal; forming composite data having the first number of bits by placing at least one lower bit of the first frame signal on the least significant bit side of the second frame signal; converting the luminance signal and color difference signal of the composite data to a second RGB signal; and correcting an amplitude of the first RGB signal corresponding to the difference between the first and second RGB signals for overdrive processing.

DETAILED DESCRIPTION

Hereinafter, a video signal processing apparatus and a video signal processing method according to at least one embodiment are described with reference to the accompanying drawings.

Figure 1:
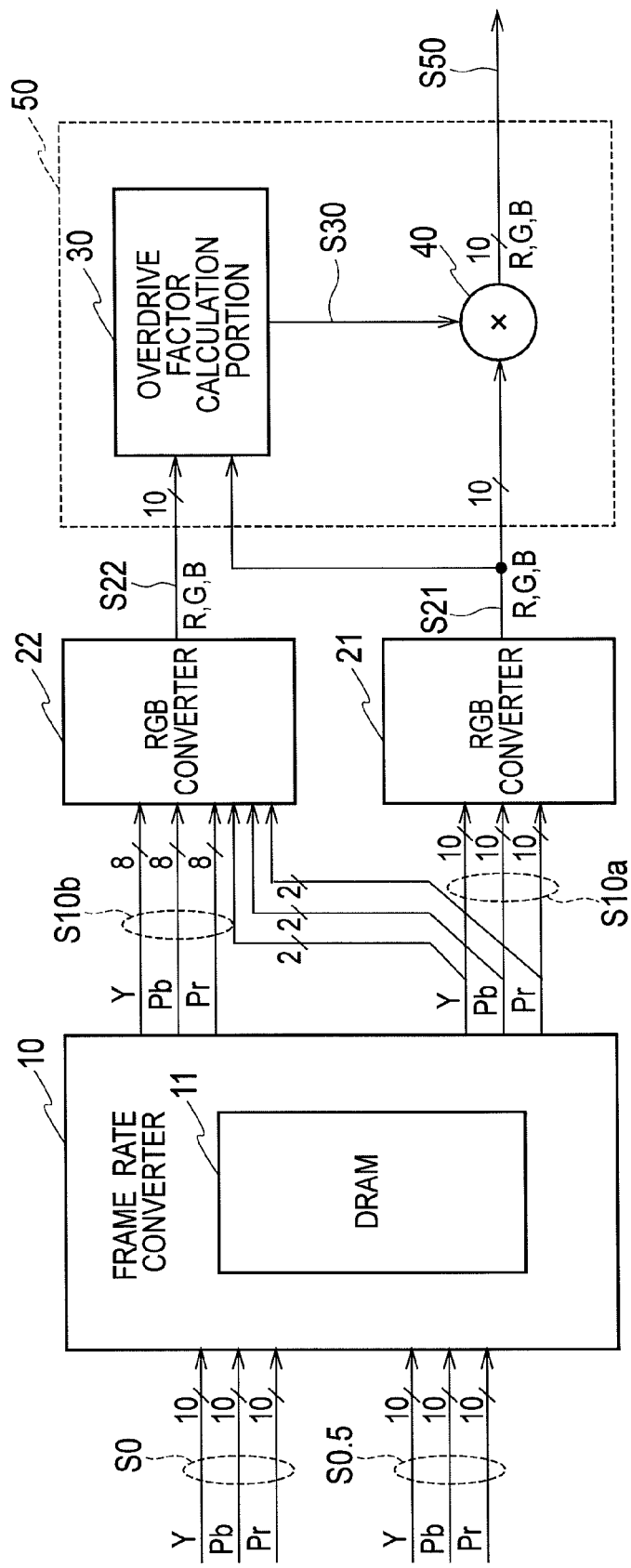
FIG. 1 is a block diagram illustrating a video signal processing apparatus of at least one embodiment.

In FIG. 1, a frame rate converter 10 receives an actual frame signal S0 as pixel data constituting actual frames of video signal and an interpolation frame signal S0.5 as pixel data constituting interpolation frames interpolated between the adjacent actual frames. In the embodiment, the actual and interpolation frame signals S0 and S0.5 are each composed of a luminance signal Y and color-difference signals Pb, Pr.

Figure 2A:
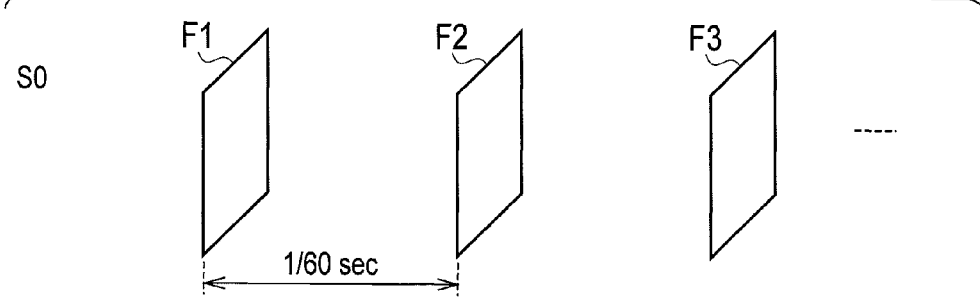
FIGS. 2A to 2C are views for explaining an operation of a frame rate converter 10 in FIG. 1.
Figure 2B:
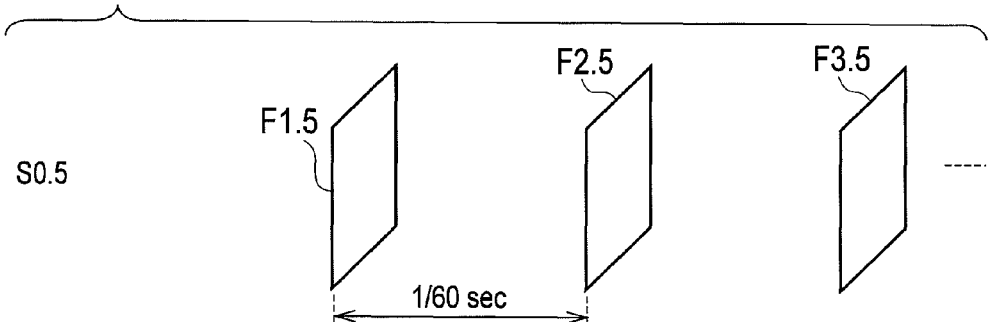

When the frame frequency of the video signal is 60 Hz, the actual frame signal S0 is composed of actual frames F1, F2, F3 ... at intervals of 1/60 seconds as illustrated in FIG. 2A, and the interpolation frame signal S0.5 is composed of interpolation frames F1.5, F2.5, F3.5 ... at intervals of 1/60 seconds as illustrated in FIG. 2B.

The interpolation frame signal S0.5 is created based on pixel data of at least two adjacent actual frames by an interpolation unit (not shown) that precedes the frame rate converter 10. The interpolation unit creates the interpolation frame signal S0.5 by motion compensation frame interpolation, for example.

The configuration and operation of the interpolation unit creating the interpolation frame signal S0.5 are well known as described in PTLs 1 and 2, and the description thereof is omitted.

In the embodiment, the luminance signal Y and color-difference signals Pb, Pr constituting the actual frame signal S0 and interpolation frame signal S0.5 are 10-bit digital data. The luminance signal Y and color-difference signals Pb, Pr have a so-called 4:4:4 format. In order to reduce the amount of data, some data of the color-difference signals Pb, Pr may be omitted so that the luminance signal Y and color-difference signals Pb, Pr have a so-called 4:2:2 format.

The frame rate converter 10 includes a DRAM (dynamic random access memory) 11 as a frame memory. The frame rate converter 10 writes the actual and interpolation frame signals S0 and S0.5 in the DRAM 11 and alternately reads the actual and interpolation frame signals S0 and S0.5 at 120 Hz, which is twice the frame signal of 60 Hz, thus converting the frame frequency of the video signal to 120 Hz.

Figure 2C:
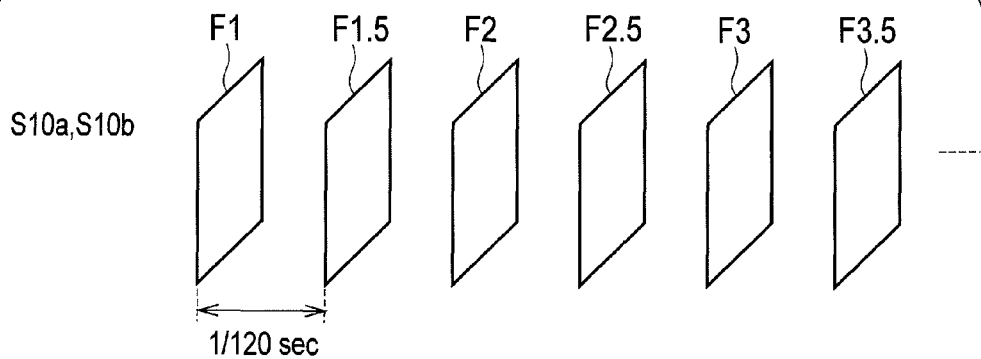

The video signal outputted from the frame rate converter 10 includes the actual frames F1, F2, F3 ... and interpolation frames F1.5, F2.5, F3.5 ... which are alternately arranged at intervals of 120 seconds, as illustrated in FIG. 2C.

The frame rate converter 10 outputs a frame signal S10a as pixel data constituting a current frame and a frame signal S10b as pixel data constituting a frame previous to the current signal (the frame signal S10a) (hereinafter, referred to as a previous frame).

In FIG. 2C, when the frame signal S10a is a signal of the actual frame F2, for example, the frame signal S10b is a signal of the interpolation frame F1.5. When the frame signal S10a is a signal of the interpolation frame F2.5, the frame signal S10b is a signal of the actual frame F2.

The frame rate converter 10 operates as follows when the actual frame signal S0 composed of actual frames is a first video signal and the interpolation frame signal S0.5 composed of interpolation frames which are interpolated between adjacent actual frames of the actual frame signal S1 is a second video signal.

The frame rate converter 10 alternately reads the actual frame signal S0 and the interpolation frame signal S0.5 from the DRAM 11 to convert the frame frequency. The frame rate converter 10 sets the interpolation frame signal S0.5 as the frame signal S10b (the second frame signal) when the actual frame signal S0 is set as the frame signal S10a (the first frame signal) and sets the actual frame signal S0 as the frame signal S10b (the second frame signal) when the interpolation frame signal S0.5 is set as the frame signal S10a.

The frame rate converter 10 outputs the frame signals S10a and S10b of two adjacent frames after conversion of the frame frequency. The actual and interpolation frame signals S0 and S0.5 are 10-bit, and therefore, the frame signals S10a and S10b outputted by the frame rate converter 10 are generally 10-bit.

In the embodiment, the frame rate converter 10 reads from the DRAM 11, ten bits of the actual or interpolation frame signal S0, S0.5 as the frame signal S10a. On the other hand, the frame rate converter 10 reads from the DRAM 11, eight bits out of 10 bits of the actual or interpolation frame signal S0 or S0.5 as the frame signal S10b, other than the lower two bits, for example.

In the embodiment, the actual and interpolation frame signals S0 and S0.5 are 10-bit, and the frame signal S10b includes upper eight bits. The number of lower bits removed maybe properly set depending on the number of bits of the actual and interpolation frame signals S0 and S0.5. The number of bits removed may be only one.

The 10-bit frame signal S10a is inputted into an RGB converter 21. The 8-bit frame signal S10b is inputted into an RGB converter 22. The RGB converter 22 also receives the lower two bits of the frame signal S10a.

Figure 3:
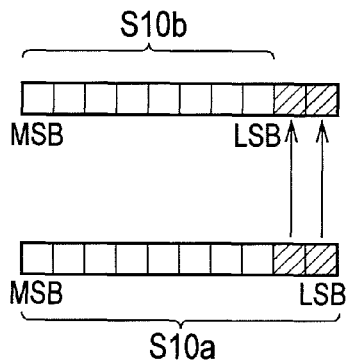
FIG. 3 is a conceptual diagram for explaining operations of RGB converters 21 and 22 in FIG. 1.

As conceptually illustrated in FIG. 3, the RGB converter 22 places the lower two bits of the frame signal S10a, which is indicated by hatching, on the least significant bit (LSB) side of the 8-bit frame signal S10b to form 10-bit data. In FIG. 3, each rectangle indicates one bit of digital data, and the MSB is the most significant bit.

When the frame signal S10b is read out from the DRAM 11 in eight bits, the data rate for accessing the DRAM 11 is lowered. This reduces the load to read the frame signal S10b from the DRAM 11, so that the signal processing can be simplified.

The RGB converter 21 converts the luminance signal Y and color difference signals Pb, Pr of the inputted frame signal S10a to red (R), green (G), and blue (B) signals. The R, G, and B signals outputted from the RGB converter 21 are referred to as RGB signals S21. For the sake of simplification, the RGB signals S21 outputted from the RGB converter 21 are shown as a single signal line in FIG. 1.

The RGB converter 22 converts to red (R), green (G), and blue (B) signals, the luminance signal Y and color difference signals Pb, Pr of the 10-bit composite data obtained by synthesizing the 8-bit frame signal S10b and the lower two bits of the frame signal S10a. The R, G, and B signals outputted from the RGB converter 22 are referred to as RGB signals S22. For the sake of simplification, the RGB signals S22 outputted from the RGB converter 22 are also shown as a single signal line in FIG. 1.

The RGB signals S21 and S22 are inputted to an overdrive processing unit 50. The overdrive processing unit 50 includes an overdrive factor calculation portion 30 and a multiplier 40. The overdrive factor calculation portion 30 receives the RGB signals S21, S22. The multiplier 40 receives the RGB signals S21.

The overdrive factor calculation portion 30 calculates a predetermined factor corresponding to the size of the difference between each RGB signal S21 and the corresponding RGB signal S22 and outputs factor signals S30. The overdrive factor calculation portion 30 is configured to create a factor for R signals, a factor for G signals, and a factor for B signals. The factor signals S30 indicate the respective factors for the R, G, and B signals.

Preferably, the overdrive factor calculation portion 30 increases the factors as the differences between the RGB signals S21 and S22 increase.

The factor signal S30 is inputted to the multiplier 40. The multiplier 40 is configured to multiply the RGB signals S21 by the respective factors for the R, G, and B signals that are indicated by the factor signals S30 and to output the overdrive-processed RGB signals. For the sake of simplification, FIG. 1 shows the multiplier 40 as a single unit, but actually, three multipliers are necessary for multiplying the R, G, and B signals by the respective factors.

As described above, the overdrive processing unit 50 outputs RGB signals 50 which are obtained by correcting the amplitude of each RGB signal S21 of the current frame corresponding to the difference between the RGB signal S21 of the current frame and the corresponding RGB signal S22 of the previous frame. The RGB signals S50 are supplied to a driving unit of a not-shown liquid crystal display device for video display.

Figure 4A:
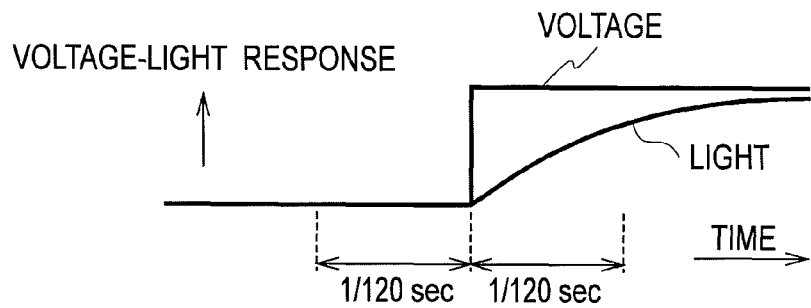
FIGS. 4A and 4B are diagrams for explaining an operation of an overdrive processing unit 50 in FIG. 1.
Figure 4B:
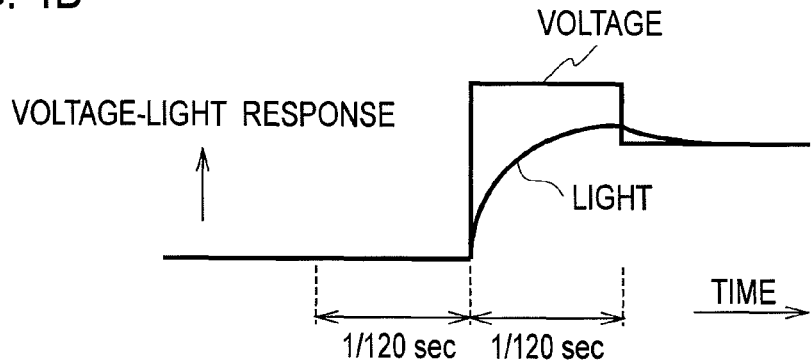

With reference to FIGS. 4A and 4B, a description is given of an example of the way how the liquid crystal display device is driven based on the RGB signals 50 which are overdrive-processed by the overdrive processing unit 50. FIG. 4A shows a voltage-light response waveform when the liquid crystal display device is not being overdriven. FIG. 4B shows a voltage-light response waveform when the liquid crystal display device is being overdriven.

As shown in FIG. 4A, even if the difference in voltage (pixel level) between the current frame and the previous frame reaches a predetermined value in the state where the liquid crystal display device is not being overdriven, the light response characteristic changes gradually because the response of the liquid crystal is slow. This can cause motion image blur.

On the other hand, when the liquid crystal display device is being overdriven, the voltage applied to the liquid crystal display is corrected so as to increase or decrease depending on the difference in pixel level between the current and previous frames, and the light response characteristic therefore changes comparatively quickly. This can cause less motion image blur.

The overdrive processing unit 50 illustrated in FIG. 1 is configured to increase or reduce the amplitude of each RGB signal S21 of the current frame depending on the difference between the same RGB signal 21 of the current frame and the corresponding RGB signal S22 of the previous frame and to multiply the RGB signal S21 of the current frame by the corresponding factor in the multiplier 40.

The specific configuration of the overdrive processing unit is not limited to that of the overdrive processing unit 50 shown in FIG. 1.

A description is given of an overdrive processing unit 51 which is another overdrive processing unit having a different configuration.

Figure 5:
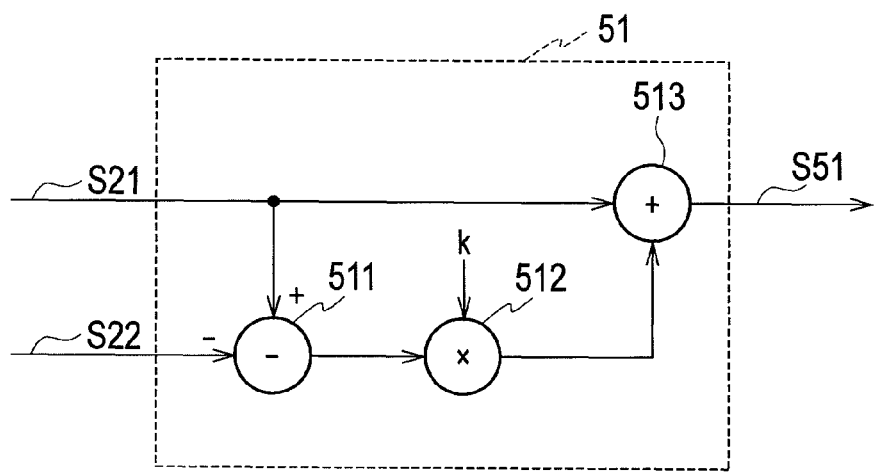
FIG. 5 is a block diagram illustrating another configuration example of the overdrive processing unit.

In FIG. 5, the RGB signals S21 are inputted to a subtractor 511 and an adder 513. The RGB signals S22 are inputted to the subtractor 511. The subtractor 511 subtracts the RGB signals S22 from the respective RGB signals S21. The outputs of the subtractor 511 represent the differences between the RGB signals S21 of the current frame and the respective RGB signals S22 of the previous frame.

The outputs of the subtractor 511 are inputted to a multiplier 512. The multiplier 512 multiplies the outputs of the subtractor 511 by a predetermined factor k. The factor k needs to be properly set corresponding to the response speed of the liquid crystal. The factor k is set to a small value when the response is comparatively fast and set to a large value when the response is comparatively slow.

The adder 513 adds up the RGB signals S21 and the respective outputs of the multiplier 512 and outputs the overdrive-processed RGB signals S51.

The operation of the overdrive processing unit 51 shown in FIG. 5 is expressed by Equation (1).

$$S51 = S21 + k(S21 - S22) \quad (1)$$

The overdrive processing unit 51 is configured to create an additional component which is to be added to each RGB signal S21 of the current frame corresponding to the difference between the RGB signal S21 of the current frame and the corresponding RGB signal S22 of the previous frame and adds the created additional component to the same RGB signal 21 of the current frame by the adder 513.

The video signal processing apparatus actually needs to include the subtractor 511, multiplier 512, and adder 513 for each of the three systems of R, G, and B signals.

Herein, a description is given of the reason why the configuration of FIG. 1 can properly overdrive the liquid crystal display device without adversely influencing the overdrive operation when the video signal requires the overdrive effect.

As revealed from the above description, the overdrive is a process necessary when the difference between the pixel level of each RGB signal S21 of the current frame and the pixel level of the corresponding RGB signal S22 of the previous frame is a predetermined value. The overdrive is not necessary when the video signal is a signal of a static image. When the video signal is a signal of a static image, the adjacent two frames of the actual and interpolation frame signals S0, S0.5 include the same data.

When the video signal is a signal of a static image, the 10-bit composite data in which the lower two bits of the frame signal S10a are placed in the 8-bit frame signal S10b which is obtained by removing the lower two bits from the 10-bit actual or interpolation frame signal S0, S0.5 is completely equal to the actual or interpolation frame signal S0, S0.5 from which the frame signal S10b is derived.

Accordingly, the differences between the RGB signals S21 of the current frame and the respective RGB signals 22 of the previous frame are 0 in the overdrive processing units 50, 51, and the liquid crystal display device cannot be overdriven. The embodiment shown in FIG. 1 therefore does not adversely influence the overdrive even when the video signal is a signal of a static image.

The RGB converter 22 only needs to convert the 8-bit luminance signal Y and color signals Pb, Pr, which are read from the DRAM 11 as the frame signal S10b, directly into the 8-bit RGB signals S22 for the purpose of just reducing the data rate for accessing the DRAM 11. This configuration is described as a comparative example.

However, in the comparative example, even when the video signal is a single of a static image, each 10-bit RGB signal S21 and the corresponding 8-bit RGB signal S22 have a difference, and the liquid crystal display device is overdriven. In the comparative example to just reduce the data rate for accessing the DRAM 11, the overdrive is executed even for the static image not requiring the overdrive effect.

Accordingly, the comparative example cannot properly overdrive the liquid crystal display device even when the video signal requires the overdrive effect.

When the video signal is a signal of a motion image, to be strict, in some cases, the 10-bit composite data, in which the lower two bits of the frame signal S10a are placed in the 8-bit frame signal S10b obtained by removing the lower two bits from the 10-bit actual or interpolation frame signal S0, S0.5, is different from those of the actual or interpolation frame signal S0, S0.5 from which the frame signal S10b is derived.

However, the upper eight bits of the 10-bit composite data are equal to those of the original actual or interpolation frame signal S0, S0.5 although the lower two bits thereof can be different. Accordingly, the difference of the lower two bits is negligible enough for the entire 10-bit composite data.

As described above, according to the embodiment, the overdrive is not executed for video signal of a static image and is executed for video signal of a motion image.

According to the embodiment, it is possible to properly overdrive the liquid crystal display device when the video signal requires the overdrive effect.

In the above description of the embodiment, the video signal inputted to the frame rate converter 10 includes the actual and interpolation frame signals S0 and S0.5. However, the video signal inputted to the frame rate converter 10 may be a stereoscopic video signal composed of a right-eye image signal and a left-eye image signal.

If the right-eye and left eye images have a parallax therebetween, the right-eye and left-eye image signals have a difference, and the overdrive processing unit 50, 51 performs overdrive processing for the stereoscopic video signal.

If the right-eye and left-eye images have no parallax, the difference between the right-eye and left-eye image signals is 0, and the overdrive processing is not performed for the stereoscopic video image.

According to this embodiment, in the case where the video signal inputted to the frame rate converter 10 is a stereoscopic video signal, the liquid crystal display device is not overdriven when the right-eye and left-eye image have no parallax and is overdriven only when the right-eye and left-eye images have a parallax.

It is therefore possible to allow the liquid crystal display device to properly operate in overdrive if the video signal requires the overdrive effect even when the inputted video signal is a stereoscopic video image.

When the video signal inputted to the frame rate converter 10 is a stereoscopic video signal, the frame rate converter 10 operates as follows. One of the right-eye and left-eye image signals of the stereoscopic video signal is set as the first video signal, and the other of the same is set as the second video signal.

The frame rate converter 10 alternately reads the first and second video signals from the DRAM 11 to convert the frame frequency.

The frame rate converter 10 sets the second video signal as the frame signal S10$b$ (the second frame signal) when the first video signal is set to the frame signal S10$a$ (the first frame signal) and sets the first video signal as the frame signal S10$b$ when the frame signal S10$a$ is set to the second video signal.

The invention is not limited to the embodiments described above and can be variously changed without departing from the scope of the invention. The luminance signal Y and color difference signals Pb, Pr are not limited to 10-bit signals.

The frame memory is composed of the DRAM 11 in FIG. 1, but may be composed of a memory other than a DRAM.

What is claimed is:

1. A video signal processing apparatus, comprising:
a frame rate converter configured to write first and second video signals in a frame memory, the first and second video signals having a first frame frequency and each including a luminance signal and a color difference signal each of which has a first number of bits, to alternately read the first and second video signals from the frame memory, and to convert and output a first frame signal and a second frame signal at a second frame frequency higher than the first frame frequency, the first frame signal being a current frame having the first number of bits, the second frame signal being a frame previous to the current frame, and having a second number of bits composed of upper bits of the first number of bits other than at least one lower bit;
a first RGB converter configured to convert the luminance signal and color difference signal of the first frame signal to a first RGB signal;
a second RGB converter configured to place at least one lower bit of the first frame signal on the least significant bit side of the second frame signal to form composite data having the first number of bits and to convert the luminance signal and color difference signal of the composite data to a second RGB signal; and
an overdrive processing unit configured to correct an amplitude of the first RGB signal corresponding to the difference between the first and second RGB signals, wherein
the frame rate converter is configured to set the second video signal as the second frame signal when the first video signal is set as the first frame signal, and set the first video signal as the second frame signal when the second video signal is set as the first frame signal.

2. The video signal processing apparatus according to claim 1,
wherein the frame rate converter is configured to set an actual frame signal composed of actual frames as the first video signal, and set an interpolation frame signal composed of interpolation frames each interpolated between pairs of the adjacent actual frames of the actual frame signal as the second video signal.

3. The video signal processing apparatus according to claim 1,
wherein the frame rate converter is configured to set one of a right-eye image signal and a left-eye image signal of a stereoscopic video signal as the first video signal, and set the other one of the right and left-eye image signals as the second video signal.

4. The video signal processing apparatus according to claim 1, wherein
the overdrive processing unit includes:
an overdrive factor calculation portion configured to calculate an overdrive factor corresponding to the difference between the first and second RGB signals; and
a multiplier configured to multiply the first RGB signal by the overdrive factor.

5. The video signal processing apparatus according to claim 1, wherein
the overdrive processing unit includes:
a subtractor configured to calculate the difference between the first and second RGB signals;
a multiplier configured to multiply the output of the subtractor by a predetermined factor; and
an adder configured to add the output of the multiplier to the first RGB signal.

6. A video signal processing method, comprising:
writing first and second video signals in a frame memory, the first and second video signals having a first frame frequency and each including a luminance signal and a color difference signal each of which has a first number of bits;
alternately reading the first and second video signals from the frame memory;
converting a first frame signal and a second frame signal to a second frame frequency higher than the first frame frequency, the first frame signal being a current frame having the first number of bits, the second frame signal being a frame previous to the current frame, and having a second number of bits composed of upper bits of the first number of bits other than at least one lower bit;
converting the luminance signal and color difference signal of the first frame signal to a first RGB signal;
forming composite data having the first number of bits by placing the at least one lower bit of the first frame signal on the least significant bit side of the second frame signal
converting the luminance signal and color difference signal of the composite data to a second RGB signal; and
correcting an amplitude of the first RGB signal corresponding to the difference between the first and second RGB signals for overdrive processing, wherein
the converting a first frame signal and a second frame signal comprises setting the second video signal as the second frame signal when the first video signal is set as the first frame signal, and setting the first video signal as the second frame signal when the second video signal is set as the first frame signal.

* * * * *